(12) United States Patent
Shim et al.

(10) Patent No.: US 10,899,867 B2
(45) Date of Patent: Jan. 26, 2021

(54) POLYTHIOL COMPOSITION FOR PLASTIC OPTICAL LENS

(71) Applicant: SKC CO., LTD., Gyeonggi-do (KR)

(72) Inventors: Jongmin Shim, Gyeonggi-do (KR); Seung Mo Hong, Incheon (KR); Hyeon Myeong Seo, Ulsan (KR); Junghwan Shin, Gyeonggi-do (KR)

(73) Assignee: SKC CO., LTD., Gyeonggi-do (KR)

(*) Notice: Subject to any disclaimer, the term of this patent is extended or adjusted under 35 U.S.C. 154(b) by 158 days.

(21) Appl. No.: 16/235,955

(22) Filed: Dec. 28, 2018

(65) Prior Publication Data
US 2019/0202969 A1    Jul. 4, 2019

(30) Foreign Application Priority Data

Dec. 28, 2017  (KR) .................... 10-2017-0182129

(51) Int. Cl.
*C08G 18/38*     (2006.01)
*C08G 18/73*     (2006.01)
(Continued)

(52) U.S. Cl.
CPC .......... *C08G 18/3876* (2013.01); *B29C 33/62* (2013.01); *B29D 11/00* (2013.01);
(Continued)

(58) Field of Classification Search
CPC ... C07C 323/50; C07C 323/51; C07C 323/52; C07C 323/53; C07C 323/54; C07C 323/55; C07C 323/56; C07C 323/57; C07C 323/58; C07C 323/59; C07C 323/60; C07C 323/61; C07C 323/62; C07C 323/63; C07C 323/64; C07C 323/65; C07C 323/66; C07C 323/67; G02B 3/00; G02B 1/00; G02B 1/04; G02B 1/041; C08G 75/04; C08G 75/045; C08G 75/06; C08G 75/08; C08G 75/10; C08G 75/12; C08G 18/30; C08G 18/34; C08G 18/341; C08G 18/343; C08G 18/246; C08G 18/3206; C08G 18/38; C08G 18/3876; C08G 18/52; C08G 18/73; C08G 18/752; C08G 18/755; C08G 18/758; C08G 18/7621; C08G 18/775; C08G 18/4009; C08G 18/4018; C08G 18/4027; C08G 18/4036; C08G 18/4045; C08G 18/4054; C08G 18/4063; C08G 18/4072; C08G 18/4081; C08G 18/42; C08G 18/4202; B29L 2011/00; B29L 2011/0008; B29L 2011/0016; B29L 2011/0025; B29L 2011/0033; B29L 2011/0041; B29L 2011/005; B29L 2011/0066; B29L 2011/0075; B29L 2011/0083; B29L 2011/0091; B29K 2081/00; B29K 2081/04; B29K 2081/06; B29D 11/00; B29D 11/00009; B29D 11/00019; B29D 11/00028; B29D 11/00259; B29D 11/00278; B29D 11/00288; B29D 11/00307; B29D 11/00317; B29D 11/00326; B29D 11/00336; B29D 11/00346; B29D 11/00355; B29D 11/00365; B29D 11/00375; B29D 11/00384; B29D 11/00394; B29D 11/00403; B29D 11/00413; B29D 11/00423; B29D 11/00432; B29D 11/00442; B29D 11/00451; B29D 11/00461; B29D 11/00471; B29D 11/00663; B29D 11/00673; B29D 11/00682; B29D 11/00692; B29D 11/00701; B29D 11/00711;
(Continued)

(56) References Cited

U.S. PATENT DOCUMENTS

2018/0186733 A1\*  7/2018  Kuma ................ G01N 21/0303

FOREIGN PATENT DOCUMENTS

EP     0329386     8/1989
EP     1950197     7/2008
(Continued)

OTHER PUBLICATIONS

WO2015190809 English Machine Translation, prepared Jul. 28, 2020. (Year: 2020).\*

(Continued)

*Primary Examiner* — Christopher M Rodd
(74) *Attorney, Agent, or Firm* — IP & T Group LLP

(57) ABSTRACT

The embodiments relate to a polythiol composition for a plastic optical lens and a polythiourethane-based plastic optical lens prepared therefrom. In the embodiments, a first polythiol compound having an ester group and a mercapto group only as a hydrogen-bondable functional group and a second polythiol compound having an ester group and a hydrogen-bondable functional group other than a mercapto group are used in an appropriate amount. Thus, it is possible to control the viscosity of a polymerizable composition at the initial stage of polymerization at a low temperature of 5 to 15° C. and to stabilize the rate of increase in the viscosity of the composition and the reaction rate thereof, thereby preventing the generation of striae, bubbles, and the like. Further, various plastic lenses such as eyeglass lenses, camera lenses, and the like having excellent appearance characteristics (without striae and bubbles) and excellent optical characteristics can be obtained from the composition.

8 Claims, No Drawings

(51) Int. Cl.
  *C08G 18/76* (2006.01)
  *G02B 1/04* (2006.01)
  *G02B 3/00* (2006.01)
  *C08G 18/75* (2006.01)
  *C08G 18/24* (2006.01)
  *B29D 11/00* (2006.01)
  *B29C 33/62* (2006.01)
  *C08G 18/32* (2006.01)
  *B29L 11/00* (2006.01)
  *B29K 81/00* (2006.01)

(52) U.S. Cl.
  CPC ....... *C08G 18/246* (2013.01); *C08G 18/3206* (2013.01); *C08G 18/38* (2013.01); *C08G 18/73* (2013.01); *C08G 18/752* (2013.01); *C08G 18/755* (2013.01); *C08G 18/758* (2013.01); *C08G 18/7621* (2013.01); *G02B 1/04* (2013.01); *G02B 1/041* (2013.01); *G02B 3/00* (2013.01); *B29K 2081/00* (2013.01); *B29L 2011/0016* (2013.01)

(58) Field of Classification Search
  CPC .......... B29D 11/00721; B29D 11/0073; B29D 11/0074; B29D 11/00759; B29D 11/00769; B29D 11/00778; B29D 11/00788; B29D 11/00798; B29D 11/00846; B29D 11/00855; B29D 11/00865; B29D 11/00875; B29D 11/00884; B29D 11/00894; B29D 11/00903; B29D 11/00913; B29D 11/00923; B29D 11/00932; B29D 11/00942; B29D 11/02; B29D 11/023; B29D 11/026; B29C 33/00; B29C 33/62
  See application file for complete search history.

(56) References Cited

FOREIGN PATENT DOCUMENTS

| | | | |
|---|---|---|---|
| EP | 2011784 | 1/2009 | |
| EP | 2891672 | 7/2015 | |
| JP | 7252207 | 10/1995 | |
| KR | 19930006918 | 7/1993 | |
| KR | 1020110091005 | 8/2011 | |
| KR | 1020170018305 | 2/2017 | |
| WO | WO 2016208707 | 12/2016 | |
| WO | WO-2016208707 A1 * | 12/2016 | ............... G02B 1/04 |

OTHER PUBLICATIONS

Lecamp, L. et al., Photoinitiated cross-linking of a thiol-methacrylate system, Polymer, Mar. 2001, pp. 2727-2736, vol. 42, Issue 7, Elsevier.

Office Action issued by the Japanese Patent Office dated Nov. 26, 2019.

Office Action issued by the Korean Intellectual Property Office dated Apr. 9, 2018.

Office Action issued by the Korean Intellectual Property Office dated Aug. 24, 2018.

Extended Search Report Issued by European Patent office dated May 24, 2019.

* cited by examiner

POLYTHIOL COMPOSITION FOR PLASTIC OPTICAL LENS

The present application claims priority of Korean patent application number 10-2017-0182129 filed on Dec. 28, 2017, which is incorporated herein by reference in its entirety.

TECHNICAL FIELD

Embodiments relate to a polythiol composition for a plastic optical lens and a polythiourethane-based plastic optical lens prepared therefrom.

BACKGROUND ART OF THE INVENTION

Optical materials using plastics are lightweight, hardly breakable, and excellent in dyeability as compared with optical materials made of inorganic materials such as glass. Therefore, plastic materials of various resins are widely used as optical materials for eyeglass lenses, camera lenses, and the like. Recently, due to an increased demand for higher performance and convenience, studies have continued on optical materials having such properties as high transparency, high refractive index, low specific gravity, high heat resistance, and high impact resistance.

Polythiourethane-based compounds are widely used as optical materials by virtue of their excellent optical characteristics and mechanical properties. A polythiourethane-based compound may be prepared by reacting a polythiol compound and an isocyanate compound. The physical properties of the polythiol compound and the isocyanate compound significantly affect the physical properties of the polythiourethane-based compound to be prepared.

Specifically, if a polymerizable composition that comprises a polythiol compound and an isocyanate compound has a low viscosity at the initial stage of polymerization/curing, striae or bubbles may be generated due to the convection of the composition. Thus, an optical material obtained therefrom, for example, a plastic lens, may be defective.

For example, Japanese Laid-open Patent Publication No. Hei 7-252207 discloses a plastic lens obtained from a tetrathiol and a polyiso(thio)cyanate compound. The tetrathiol used in the above patent publication has a problem in that it forms a crosslinked structure at a low temperature, which tends to excessively increases the viscosity during polymerization, resulting in striae.

In order to prevent the generation of striae, bubbles, and the like, a method of using a compound that contains a hydrogen-bondable functional group to increase the viscosity of the composition at the initial stage of polymerization to an appropriate level may be considered. However, if the compound, which contains a hydrogen-bondable functional group, is used in an excessive amount, the rate of increase in the viscosity may be too fast, which may expedite the generation of striae.

PRIOR ART DOCUMENT

Patent Document (Patent document 1) Japanese Laid-open Patent Publication No. Hei 7-252207

DISCLOSURE OF THE INVENTION

Technical Problem to be Solved

Therefore, the embodiments aim to provide a high quality polythiourethane-based compound and a plastic optical lens, in which a polythiol compound having a hydrogen-bondable functional group is used in an appropriate amount to thereby control the rate of increase in the viscosity of a polymerizable composition that comprises the same at the initial stage of polymerization and the reaction rate thereof, thereby reducing the generation of striae, bubbles, and the like.

Solution to the Problem

An embodiment provides a polythiol composition, which comprises a first polythiol compound having an ester group and a mercapto group only as a hydrogen-bondable functional group; and a second polythiol compound having an ester group and a hydrogen-bondable functional group other than a mercapto group.

Another embodiment provides a polythiol composition, which comprises a first polythiol compound having four mercapto groups only as a hydrogen-bondable functional group; and a second polythiol compound having three mercapto groups and one hydroxyl group as a hydrogen-bondable functional group.

Still another embodiment provides a polymerizable composition, which comprises a polythiol composition, which comprises a first polythiol compound and a second polythiol compound, and an isocyanate compound, wherein the first polythiol compound has an ester group and a mercapto group only as a hydrogen-bondable functional group; and the second polythiol compound has an ester group and a hydrogen-bondable functional group other than a mercapto group.

Still another embodiment provides an optical lens, which comprises a polythiourethane-based resin formed by curing a polymerizable composition, which comprises a polythiol composition, which comprises a first polythiol compound and a 10 second polythiol compound, and an isocyanate compound, wherein the first polythiol compound has an ester group and a mercapto group only as a hydrogen-bondable functional group; and the second polythiol compound has an ester group and a hydrogen-bondable functional group other than a mercapto group.

Advantageous Effects of the Invention

In the embodiments, a first polythiol compound having an ester group and a mercapto group only as a hydrogen-bondable functional group and a second polythiol compound having an ester group and a hydrogen-bondable functional group other than a mercapto group are used in an appropriate amount. Thus, it is possible to control the viscosity of a polymerizable composition at the initial stage of polymerization at a low temperature of 5 to 15° C. and to stabilize the rate of increase in the viscosity of the composition and the reaction rate thereof, thereby preventing the generation of striae, bubbles, and the like. Further, various plastic optical lenses such as eyeglass lenses, camera lenses, and the like having excellent appearance characteristics (without striae and bubbles) and excellent optical characteristics can be obtained from the composition.

DETAILED DESCRIPTION FOR CARRYING OUT THE INVENTION

Hereinafter, the present invention will be described in detail with reference to the embodiments. The embodiments are not limited to those described below. Rather, they may be modified into various forms as long as the gist of the invention is not altered.

In this specification, when a part is referred to as "comprising" an element, it is to be understood that the part may comprise other elements as well.

In addition, all numbers and expression related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

An embodiment provides a polythiol composition, which comprises a first polythiol compound having an ester group and a mercapto group only as a hydrogen-bondable functional group; and a second polythiol compound having an ester group and a hydrogen-bondable functional group other than a mercapto group.

The polythiol composition may comprise 2 to 30 parts by weight, 2 to 25 parts by weight, 3 to 25 parts by weight, or 3 to 20 parts by weight of the second polythiol compound per 100 parts by weight of the first polythiol compound.

The first polythiol compound may have three or more, or four or more, mercapto groups. Specifically, it may have four or more mercapto groups. More specifically, it may have four mercapto groups.

The first polythiol compound may be employed in an amount of 50 to 99% by weight, 50 to 85% by weight, 55 to 99% by weight, 55 to 90% by weight, 60 to 85% by weight, or 65 to 85% by weight, based on the total weight of the polythiol composition. In addition, the first polythiol compound may have a weight average molecular weight (Mw) of 350 to 600 g/mole or 400 to 500 g/mole. Further, the first polythiol compound may contain oxygen atoms in an amount of 20 to 34% by mole, or 24 to 34% by mole, based on the total molar amount of the first polythiol compound.

The second polythiol compound may have three mercapto groups and a hydrogen-bondable functional group other than a mercapto group. Here, the hydrogen-bondable functional group other than a mercapto group may be a hydroxyl group, an amine group, an amide group, a carboxyl group, or the like. Specifically, the second polythiol compound may have three or more mercapto groups and one or more hydrogen-bondable functional group. More specifically, it may have three mercapto groups and one hydroxyl group.

The second polythiol compound may be employed in an amount of 1 to 50% by weight, 1 to 45% by weight, 1 to 40% by weight, 3 to 15% by weight, 3 to 13% by weight, or 4 to 12% by weight, based on the total weight of the polythiol composition. Within the above amount range, it is possible to appropriately control the viscosity of a polymerizable composition that comprises the polythiol composition and to stabilize the increase in the viscosity at the initial stage of polymerization and the polymerization rate, thereby preventing the generation of striae and bubbles. In addition, the second polythiol compound may have a weight average molecular weight (Mw) of 275 to 575 g/mole or 315 to 475 g/mole.

Further, the second polythiol compound may contain oxygen atoms in an amount of 20 to 35% by mole, or 25 to 35% by mole, based on the total molar amount of the second polythiol compound.

According to an embodiment, the polythiol composition may comprise a first polythiol compound having 4 mercapto groups only as a hydrogen-bondable functional group; and a second polythiol compound having 3 mercapto groups and 1 hydroxyl group as a hydrogen-bondable functional group.

According to an embodiment, the first polythiol compound may be a compound represented by the following Formula 4 and/or 5, and the second polythiol compound may be a compound represented by the following Formula 6 and/or 7:

[Formula 4]

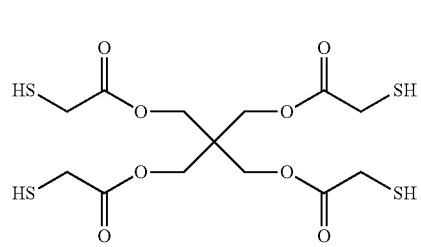

[Formula 5]

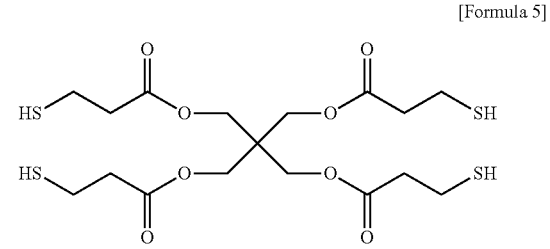

[Formula 6]

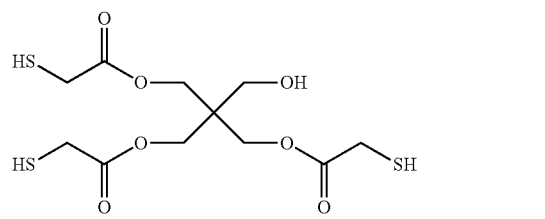

[Formula 7]

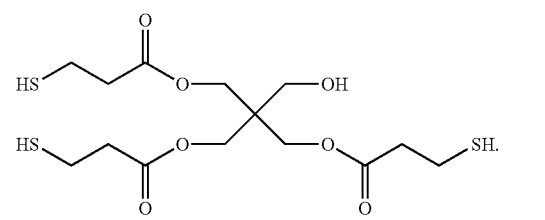

Specifically, the polythiol composition according to an embodiment may comprise a first polythiol compound represented by the above Formula 4 and a second polythiol compound represented by the above Formula 6. Further, the first polythiol compound represented by the above Formula 4 may be employed in an amount of 50 to 85% by weight, and the second polythiol compound represented by the above Formula 6 may be employed in an amount of 3 to 15% by weight, based on the total weight of the polythiol composition.

In addition, the polythiol composition according to an embodiment may comprise a first polythiol compound represented by the above Formula 5 and a second polythiol compound represented by the above Formula 7. Further, the first polythiol compound represented by the above Formula 5 may be employed in an amount of 50 to 85% by weight, and the second polythiol compound represented by the above Formula 7 may be employed in an amount of 3 to 15% by weight, based on the total weight of the polythiol composition.

Further, the polythiol composition according to an embodiment may comprise a first polythiol compound represented by the above Formulae 4 and 5 and a second polythiol compound represented by the above Formulae 6 and 7. Further, the first polythiol compound represented by the above Formulae 4 and 5 may be employed in an amount of 50 to 85% by weight, and the second polythiol compound represented by the above Formulae 6 and 7 may be employed in an amount of 3 to 15% by weight, based on the total weight of the polythiol composition.

The polythiol composition may be prepared by subjecting a compound represented by the following Formula 1, a compound represented by the following formula 2, and/or a compound represented by the following Formula 3 to a non-hydrocondensation reaction.

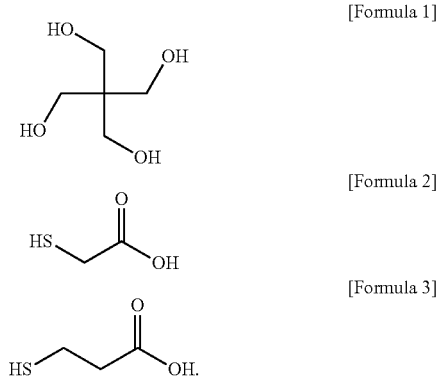

Specifically, the polythiol composition may be prepared by gradually heating a compound represented by the above Formula 1 (pentaerythritol) and a compound represented by the above Formula 2 (thioglycolic acid) or a compound represented by the above Formula 3 (3-mercaptopropionic acid) in an organic solvent in the presence of a sulfonic acid catalyst to the boiling point of the organic solvent for azeotropic distillation thereof.

In such event, the reaction temperature may be 60 to 150° C. or 60 to 130° C. A sulfonic acid-based catalyst such as para-toluenesulfonic acid, sulfuric acid, benzenesulfonic acid, naphthalenesulfonic acid, fluorosulfonic acid, and chlorosulfonic acid may be used as the catalyst in the reaction. The organic solvent preferably has a boiling point of 60 to 130° C. and is capable of being subjected to azeotropic distillation with water. For example, an organic solvent such as toluene, xylene, benzene, hexane, and heptane may be used. If the boiling point of the organic solvent is lower than 60° C., it may be difficult for the reaction to be carried out. If it is higher than 130° C., a disulfide is formed by a reaction between the thiols, which may drastically increase the viscosity and molecular weight of the compound thus synthesized.

The polythiol composition thus prepared by the reaction may be further purified. For example, it may be subjected to several times of aqueous alkalisolution washing, aqueous acid solution washing, and water washing. Only the organic layer may be obtained by the washing step to thereby obtain a polythiol composition that comprises the desired polythiol compounds.

Thereafter, if desired, the polythiol composition may be subjected to drying, filtration, and the like.

The types of the compounds in the polythiol composition may be changed if different amounts of the compounds represented by the Formula 2 and/or Formula 3 are used based on the same amount of the compound represented by the Formula 1.

Specifically, the polythiol composition may be obtained by reacting the compounds represented by the Formula 2 and/or Formula 3 in an amount of 3.7 to 5.0 moles, or 4.0 to 4.8 moles, per 1 mole of the compound represented by the Formula 1. In such event, the polythiol composition thus produced may comprise, as a main component, the compounds represented by the above Formula 4 and/or Formula 5.

In addition, the polythiol composition may be obtained by reacting the compounds represented by the Formula 2 and/or Formula 3 in an amount of 2.5 to 3.6 moles, or 3.0 to 3.6 moles, per 1 mole of the compound represented by the Formula 1. In such event, the polythiol composition thus produced may comprise, as a main component, the compounds represented by the above Formula 6 and/or Formula 7.

An embodiment may provide a process for preparing a polythiol composition, which may be prepared by subjecting a compound represented by the following Formula 1, a compound represented by the following formula 2, and/or a compound represented by the following Formula 3 to a non-hydrocondensation reaction.

An embodiment provides a polymerizable composition that comprises the polythiol composition and an polyisocyanate compound. Specifically, the polymerizable composition comprises a polythiol composition, which comprises a first polythiol compound and a second polythiol compound, and an polyisocyanate compound, wherein the first polythiol compound has an ester group and a mercapto group only as a hydrogen-bondable functional group; and the second polythiol compound has an ester group and a hydrogen-bondable functional group other than a mercapto group.

After the polymerizable composition is degassed at a temperature of 5 to 15° C. and a pressure of 0.1 to 10 torr for 0.5 to 3 hours, it may have a viscosity of 50 to 100 cps, 60 to 100 cps, 70 to 100 cps, or 75 to 100 cps, at a temperature of 10° C. Only when the polymerizable composition has a viscosity within the above range, the reactivity can be maintained during the polymerization, thereby preventing the generation of bubbles and preventing such uneven hardening as striae upon curing thereof.

The polyisocyanate compound is not particularly limited as long as it is a compound having at least two isocyanate groups in the molecule.

Specifically, examples of the polyisocyanate compound may include an aliphatic polyisocyanate compound such as hexamethylene diisocyanate, 1,5-pentane diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanatomethyloctane, bis(isocyanatoethyl) carbonate, bis(isocyanatoethyl) ether, lysine diisocyanato methyl ester, lysine triisocyanate, 1,2-diisothiocyanatoethane, 1,6-diisothiocyanatohexane, isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane isocyanate, 2,5-bis(isocyanatomethyl)-bicyclo[2.2.1]heptane, 2,6-bis(isocyanatomethyl)-bicyclo[2.2.1]heptane, 3,8-bis(isocyanatomethyl)tricyclodecane, 3,9-bis(isocyanatomethyl)tricyclodecane, 4,8-bis(isocyanatomethyl)tricyclodecane, 4,9-bis (isocyanatomethyl)tricyclodecane, bis(4-isocyanatocyclohexyl)methane, 1,3-bis(isocyanatomethyl)cyclohexane, 1,4-bis(isocyanatomethyl)cyclohexane, and cyclohexane diisothiocyanate; an aromatic polyisocyanate compound such as 1,2-diisocyanatobenzene, 1,3-diisocyanatobenzene, 1,4-diisocyanatobenzene, tolylene diisocyanate, 2,4-diisocyanatotoluene, 2,6-diisocyanatotoluene, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluene diisocyanate, toluidine diisocyanate, 4,4'-methylene-bis(phenyl isocyanate), 4,4'-methylene-bis(2-methylphenyl isocyanate), dibenzyl-4,4'-diisocyanate, bis(isocyanatophenyl)ethylene, bis(isocyanatomethyl)benzene, m-xylene diisocyanate, bis(isocyanatoethyl)benzene, bis(isocyanatopropyl)benzene, α,α,α',α'-tetramethyl xylylene diisocyanate, bis(isocyanatobutyl)benzene, bis(isocyanatomethyl)naphthalene, bis(isocyanatomethylphenyl)ether, bis(isocyanatoethyl)phthalate, 2,5-di(isocyanatomethyl)furan, 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-methylene-bis(phenyl isothiocyanate), 4,4'-methylene-bis(2-methylphenyl isothiocyanate), 4,4'-methylene-bis(3-methylphenyl isothiocyanate), 4,4'-diisothiocyanatobenzophenone, 4,4'-diisothiocyanato-3,3'-dimethylbenzophenone, and bis(4-isothiocyanatophenyl)ether; an aliphatic polyisocyanate compound containing sulfur such as bis(isocyanatomethyl) sulfide, bis(isocyanatoethyl) sulfide, bis(isocyanatopropyl) sulfide, bis(isocyanatohexyl) sulfide, bis(isocyanatomethyl) sulfone, bis(isocyanatomethyl) disulfide, bis(isocyanatoethyl) disulfide, bis(isocyanatopropyl) disulfide, bis(isocyanatomethylthio)methane, bis(isocyanatoethylthio)methane, bis(isocyanatomethylthio)ethane, bis(isocyanatoethylthio)ethane, 1,5-diisocyanato-2-isocyanatomethyl-3-thiapentane, 1,2,3-tris(isocyanatomethylthio)propane, 1,2,3-tris(isocyanatoethylthio)propane, 3,5-dithia-1,2,6,7-heptane tetraisocyanate, 2,6-diisocyanatomethyl-3,5-dithia-1,7-heptane diisocyanate, 2,5-diisocyanate methyl thiophene, 4-isocyanatoethylthio-2,6-dithia-1,8-octane diisocyanate, thiobis(3-isothiocyanatopropane), thiobis(2-isothiocyanatoethane), dithiobis(2-isothiocyanatoethane), 2,5-diisocyanatotetrahydrothiophene, 2,5-diisocyanatomethyltetrahydrothiophene, 3,4-diisocynatomethyltetrahydrothiophene, 2,5-diisocyanato-1,4-dithiane, 2,5-diisocyanatomethyl-1,4-dithiane, 4,5-diisocyanato-1,3-dithiolane, 4,5-bis(isocyanatomethyl)-1,3-dithiolane, and 4,5-diisocyanatomethyl-2-methyl-1,3-dithiolane; an aromatic sulfide-based polyisocyanate compound such as 2-isocyanatophenyl-4-isocyanatophenyl sulfide, bis(4-isocyanatophenyl) sulfide, and bis(4-isocyanatomethylphenyl) sulfide; an aromatic disulfide-based polyisocyanate compound such as bis(4-isocyanatophenyl) disulfide, bis(2-methyl-5-isocyanatophenyl) disulfide, bis(3-methyl-5-isocyanatophenyl) disulfide, bis(3-methyl-6-isocyanatophenyl) disulfide, bis(4-methyl-5-isocyanatophenyl) disulfide, and bis(4-methoxy-3-isocyanatophenyl) disulfide.

More specifically, the polyisocyanate compound may be 1,3-bis(isocyanatomethyl)cyclohexane, hexamethylene diisocyanate, isophorone diisocyanate, m-xylene diisocyanate, toluene diisocyanate, or a mixture thereof.

In addition, it is also possible to use a halogen substituted form such as chlorine substituted form, a bromine substituted form, or the like, an alkyl substituted form, an alkoxy substituted form, a nitro substituted form, a prepolymer-type modified form with a polyhydric alcohol, a carbodiimide modified form, a urea modified form, a biuret modified form, or a dimerization or trimerization reaction product of the polyisocyanate compound as described above. In such event, the above-exemplified compounds may be used alone or in combination of two or more thereof.

The polymerizable composition may further comprise such additives as an internal mold release agent, a heat stabilizer, an ultraviolet absorber, and a bluing agent, depending on the purpose thereof.

Examples of the internal mold release agent include a fluorine-based nonionic surfactant having a perfluoroalkyl group, a hydroxyalkyl group, or a phosphate ester group; a silicone-based nonionic surfactant having a dimethylpolysiloxane group, a hydroxyalkyl group, or a phosphate ester group; an alkyl quaternary ammonium salt such as trimethylcetylammonium salt, trimethylstearylammonium salt, dimethylethylcetylammonium salt, triethyldodecylammonium salt, trioctylmethylammonium salt, and diethylcyclohexadodecylammonium salt; and an acidic phosphate ester. It may be used alone or in combination of two or more.

As the heat stabilizer, a metal fatty acid salt, a phosphorus compound, a lead compound, or an organotin compound may be used alone or in combination of two or more.

As the ultraviolet absorber, benzophenone-based, benzotriazole-based, salicylate-based, cyanoacrylate-based, oxanilide-based, or the like may be used.

The bluing agent has an absorption band in the wavelength range from orange to yellow in the visible light region and has a function of adjusting the color of an optical material made of a resin. Specifically, the bluing agent may comprise a material that exhibits blue to violet color, but is not particularly limited thereto. In addition, examples of the bluing agent include a dye, a fluorescent whitening agent, a fluorescent pigment, and an inorganic pigment. It may be properly selected in accordance with the properties required for an optical component to be produced and the resin color. The bluing agent may be used alone or in combination of two or more.

In view of the solubility in the polymerizable composition and the transparency of the optical material to be produced, a dye is preferably used as the bluing agent. From the viewpoint of the absorption wavelength, the dye may particularly have a maximum absorption wavelength of 520 to 600 nm; and more particularly, a maximum absorption wavelength of 540 to 580 nm. In addition, in terms of the structure of the compound, an anthraquinone-based dye is preferable as the dye. The method of adding the bluing agent is not particularly limited, and the bluing agent may be added to the monomers in advance. Specifically, various methods can be used; for example, the bluing agent may be dissolved in the monomers or may be contained in a master solution in a high concentration, the master solution being later diluted with the monomers or other additives and then added.

An embodiment provides a polythiourethane-based compound prepared from the polymerizable composition as described above. Specifically, the polymerizable composition may be preliminarily polymerized at a temperature of 5° C. to 15° C. and then cured to prepare a polythiourethane-based compound.

More specifically, the polymerizable composition is degassed under reduced pressures and then injected into a mold for molding a lens. Such degassing and mold injection may be carried out in a low temperature range of, for example, 0 to 30° C. or 5 to 15° C. Once the composition is injected into the mold, preliminary polymerization is carried out under the same temperature condition (i.e., at a low temperature) to stabilize the polymerization rate. Specifically, the preliminary polymerization is carried out at a temperature of 0 to 30° C. or 5 to 15° C. for 1 to 30 hours or 1 to 20 hours, so as to prevent a high reaction rate during the thermal curing, i.e., to prevent a convection phenomenon that may be caused by rapid curing and defective appearance of a lens such as striae generated by the convection phenomenon.

Upon the preliminary polymerization, polymerization is carried out by a conventional method. For example, the polymerization is usually carried out by gradually heating the composition from a low temperature to a high temperature. The polymerization temperature may be, for example, 20 to 150° C., particularly 25 to 130° C.

Then, the polythiourethane-based plastic optical lens is released from the mold.

The polythiourethane-based plastic optical lens may have various shapes by changing the mold used in the production thereof. Specifically, it may be in the form of an eyeglass lens, a camera lens, or the like.

An embodiment is capable of providing a polythiourethane-based plastic optical lens prepared from a polythiourethane-based compound by the process as described above. Specifically, the optical lens comprises a polythiourethane-based resin formed by curing a polymerizable composition, which comprises a polythiol composition, which comprises a first polythiol compound and a second polythiol compound, and an isocyanate compound, wherein the first polythiol compound has an ester group and a mercapto group only as a hydrogen-bondable functional group; and the second polythiol compound has an ester group and a hydrogen-bondable functional group other than a mercapto group.

If required, the plastic optical lens may be subjected to physical or chemical treatment such as surface polishing, antistatic treatment, hard coat treatment, anti-reflection coat treatment, dyeing treatment, and dimming treatment for the purpose of imparting thereto anti-reflection, hardness, abrasion resistance, chemical resistance, anti-fogging, or fashionity.

The plastic optical lens may have a refractive index of 1.5910 to 1.5991 or 1.5912 to 1.5991. In addition, the plastic optical lens may have a glass transition temperature (Tg) of 85 to 95° C., 85 to 93° C., or 88 to 92° C.

As described above, in the embodiments, a first polythiol compound having an ester group and a mercapto group only as a hydrogen-bondable functional group and a second polythiol compound having an ester group and a hydrogen-bondable functional group other than a mercapto group are used in an appropriate amount. Thus, it is possible to control the viscosity of a polymerizable composition at the initial stage of polymerization at a low temperature of 5 to 15° C. and to stabilize the rate of increase in the viscosity of the composition and the reaction rate thereof, thereby preventing the generation of striae, bubbles, and the like. Further, various plastic lenses such as eyeglass lenses, camera lenses, and the like having excellent appearance characteristics (without striae and bubbles) and excellent optical characteristics can be obtained from the composition.

Hereinafter, the present invention is explained in detail by Examples. The following Examples are intended to further illustrate the present invention, and the scope of the Examples is not limited thereto.

EXAMPLE

Synthesis Example 1: Preparation of Polythiol Compounds

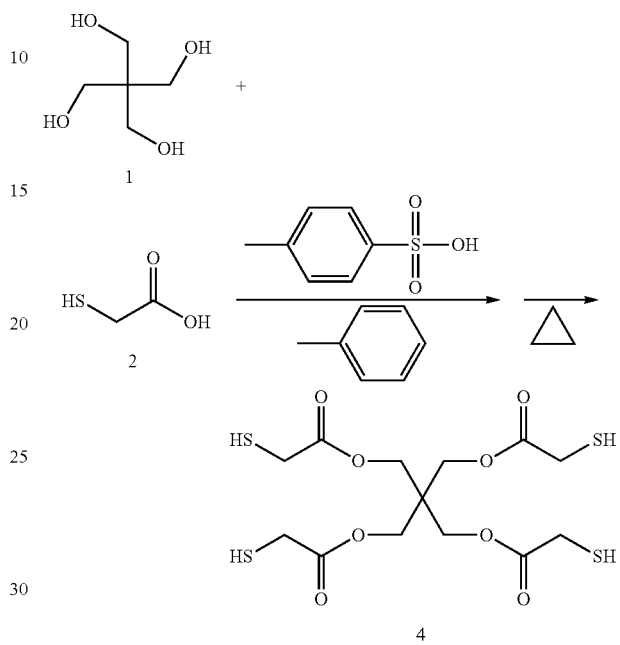

A reactor equipped with a mechanical stirrer, a Dean Stark apparatus with a cooling tube, a thermometer connected to a temperature controller, and a heating mantle was charged with 187.5 g (2.04 moles) of thioglycolic acid, 63.0 g (0.46 mole) of pentaerythritol, 0.8 g of p-toluenesulfonic acid, and 469.0 g of toluene. The mixture was stirred for 60 minutes and then reacted at 130° C. for 8 hours. In such event, a nitrogen tube was installed inside the reactor through which nitrogen was continuously fed to remove water generated during the reaction in the reactor, to thereby induce the reaction towards the forward reaction. Here, the amount of water removed was 98.9% of the theoretical amount. Then, the temperature was lowered to room temperature, and an organic layer was then obtained by performing alkali washing, acid washing, and water washing in this order. The organic layer thus obtained was heated and depressurized to remove the solvent. It was then cooled to room temperature and filtered to obtain 199.5 g of a polythiol composition comprising the compound represented by Formula 4 as a main component.

The polythiol composition thus obtained was quantified by an absolute calibration method using a liquid chromatograph (Shimadzu, Nexera SR, detector: photo-diode array (PDA)) to analyze the compounds contained in the composition. As a result, the polythiol composition thus obtained contained 76% by weight of the polythiol compound represented by Formula 4, 2% by weight of the polythiol compound represented by Formula 6, and 22% by weight of other oligomeric compounds than the compounds of Formulae 4 and 6.

Synthesis Example 2: Preparation of Polythiol Compounds

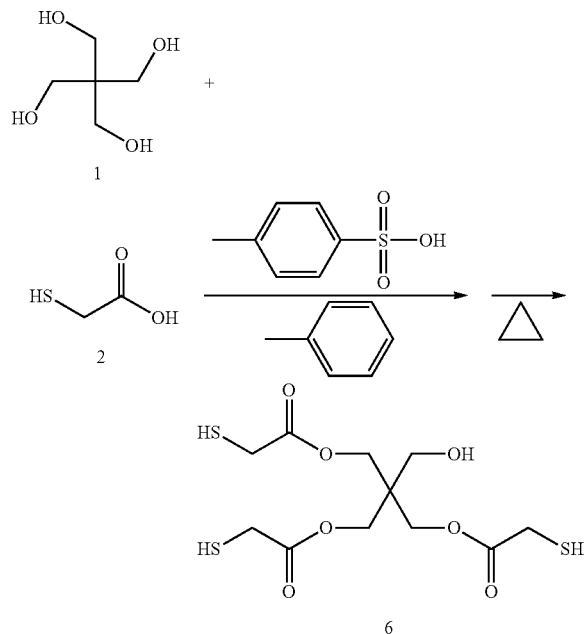

The same procedure as in Synthesis Example 1 was carried out, except that 147.3 g (1.60 moles) of thioglycolic acid, 66.0 g (0.48 mole) of pentaerythritol, and 491.3 g of toluene were used. The amount of water removed was 98.5% of the theoretical amount.

As a result of the above reaction, 200.6 g of a polythiol composition comprising the polythiol compound represented by the above Formula 6 as a main component was obtained. As a result of an analysis of the composition thus obtained by an absolute calibration method, the polythiol composition thus obtained contained 79% by weight of the polythiol compound represented by Formula 6, 20% by weight of the polythiol compound represented by Formula 4, and 1% by weight of other oligomeric compounds than the compounds of Formulae 4 and 6.

Synthesis Example 3: Preparation of Polythiol Compounds

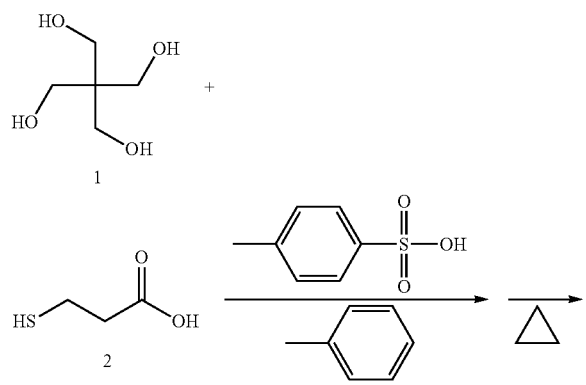

The same procedure as in Synthesis Example 1 was carried out, except that 193.5 g (1.82 moles) of 3-mercaptopropionic acid, 56.4 g (0.41 mole) of pentaerythritol, 0.7 g of p-toluenesulfonic acid, and 420.0 g of toluene were charged to the reactor. The amount of water removed was 99.0% of the theoretical amount.

As a result of the above reaction, 202.2 g of a polythiol composition comprising the polythiol compound represented by the above Formula 5 as a main component was obtained. As a result of an analysis of the composition thus obtained by an absolute calibration method, the polythiol composition thus obtained contained 78% by weight of the polythiol compound represented by Formula 5, 2% by weight of the polythiol compound represented by Formula 7, and 20% by weight of other oligomeric compounds than the compounds of Formulae 5 and 7.

Synthesis Example 4: Preparation of Polythiol Compounds

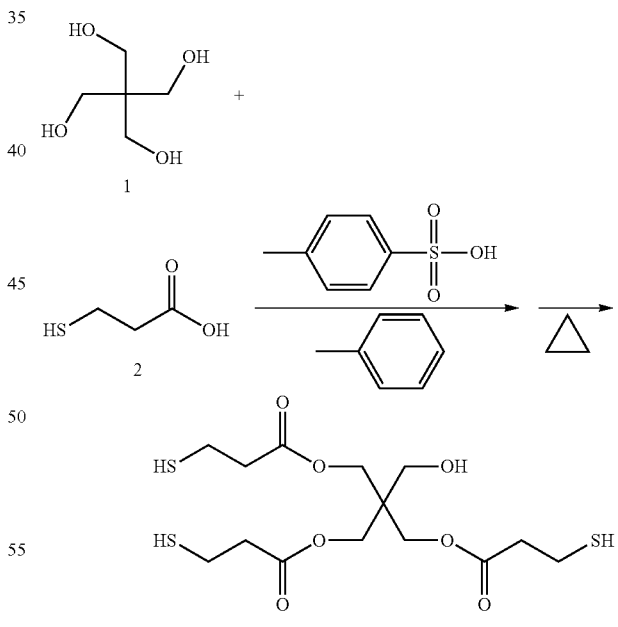

The same procedure as in Synthesis Example 3 was carried out, except that 149.2 g (1.41 moles) of 3-mercaptopropionic acid, 58.0 g (0.43 mole) of pentaerythritol, and 432.0 g of toluene were used. The amount of water removed was 98.1% of the theoretical amount.

As a result of the above reaction, 200.9 g of a polythiol composition comprising the polythiol compound represented by the above Formula 7 as a main component was obtained. As a result of an analysis of the composition thus obtained by an absolute calibration method, the polythiol composition thus obtained contained 79% by weight of the polythiol compound represented by Formula 7, 20% by weight of the polythiol compound represented by Formula 5, and 1% by weight of other oligomeric compounds than the compounds of Formulae 5 and 7.

EXAMPLE: PREPARATION OF A PLASTIC OPTICAL LENS

Example 1

102.1 g of m-xylene diisocyanate and 1.8 g of 2-(2-hydroxy-5-tert-octylphenyl)benzotriazole were homogeneously mixed. Added thereto were 0.22 g of Zelec® UN (acidic phosphate alkyl ester release agent, Stepan Company) as an internal mold release agent and 0.03 g of dibutyltin dichloride as a polymerization catalyst. 117.3 g of a polythiol composition obtained by mixing 112.0 g of the polythiol composition of the Synthesis Example 1 and 5.3 g of the polythiol composition of the Synthesis Example 2 at 15° C. was added thereto, which was homogeneously mixed to prepare a polymerizable composition. In such event, the contents of the compounds of Synthesis Examples 1 and 2 in the polythiol composition were adjusted such that it contained 73.5% by weight of the polythiol compound represented by Formula 4, 4.2% by weight of the polythiol compound represented by Formula 6, and 22.3% by weight of other oligomeric compounds than the compounds of Formulae 4 and 6.

The polymerizable composition was degassed at 10° C. and 2 torr for 1 hour and then filtered through a Teflon filter of 3 μm. The filtered polymerizable composition was injected into a glass mold assembled with an adhesive tape. The mold was then heated from 10° C. to 120° C. to carry out the polymerization for 20 hours. The cured resin in the glass mold was further cured at 125° C. for 4 hours, and then the molded article was released from the glass mold. The molded article was a circular lens (optical lens) having a center thickness of 1.2 mm (deviation: −5.00), −4.00 D, and a diameter of 75 mm. The lens was impregnated in a STI ITN-8H hard coating solution (Finecoat Co.) and then thermally cured for coating it.

Examples 2 and 3 and Comparative Examples 1 and 2

The same procedure as in Example 1 was carried out, except that the polythiol compositions comprising various types and contents of polythiol compounds were used as shown in Table 1 below.

Example 4

The same procedure as in Example 1 was carried out, except that 2.4 g of 2-(2-hydroxy-5-tert-octylphenyl)benzotriazole and a mixture of 125.8 parts by weight of the polythiol composition of Synthesis Example 3 and 6.6 parts by weight of the polythiol composition of Synthesis Example 4 as a polythiol composition were used. In such event, the contents of the compounds of Synthesis Examples 3 and 4 in the polythiol composition were adjusted such that it contained 82.7% by weight of the polythiol compound represented by Formula 5, 5.1% by weight of the polythiol compound represented by Formula 7, and 12.2% by weight of other oligomeric compounds than the compounds of Formulae 5 and 7.

Examples 5 and 6 and Comparative Examples 3 and 4

The same procedure as in Example 4 was carried out, except that the polythiol compositions comprising various types and contents of polythiol compounds were used as shown in Table 1 below.

Evaluation Example: Property Measurement

The properties of the plastic optical lenses prepared in Examples 1 to 6 and Comparative Examples 1 to 4 were each measured in accordance with the methods as described below. The measurement results are shown in Table 1 below.

Evaluation Example 1: Viscosity

The initial viscosity and the viscosity after 5 hours of the polymerizable compositions prepared in Examples 1 to 6 and Comparative Examples 1 to 4 were each measured at 10° C. using a non-contact viscometer (EMS-1000, Kyoto Electronics Manufacturing Co., Ltd.) after degassing and filtering thereof.

Evaluation Example 2: Refractive Index

The refractive index of each of the lenses prepared in Examples 1 to 6 and Comparative Examples 1 to 4 was measured at 20° C. using a refractometer DR-M4 manufactured by Atago Co.

Evaluation Example 3: Generation Rate of Striae

For 100 lenses prepared in Examples 1 to 6 and Comparative Examples 1 to 4, light was transmitted through a lens using a mercury lamp as a light source. The transmitted light was projected onto a white plate, and the presence or absence of a contrast was visually checked to determine the generation of striae. The generation rate of striae was evaluated as (number of lenses that have striae/number of lenses measured (100))*100.

Evaluation Example 4: Heat Resistance

The glass transition temperature (Tg, ° C.) of each of the lenses prepared in Examples 1 to 6 and Comparative Examples 1 to 4 was measured with TMA Q400 (TA Co.) under the penetration method (load of 50 g, pin line of 0.5 mm D, temperature elevation rate of 10° C./min).

TABLE 1

| | Type and content of polythiol compound (% by weight) | | | | Viscosity (cps, at 10° C.) | | | | |
|---|---|---|---|---|---|---|---|---|---|
| | First polythiol (having 4 mercapto groups) | | Second polythiol (having 1 hydrogen-bondable functional group and 3 mercapto groups) | | Initial | After 5 hours | Striae | RI | HR (° C.) |
| Ex. 1 | Formula 4 | 73.5 | Formula 6 | 4.2 | 59 | 87 | 2 | 1.5991 | 92 |
| Ex. 2 | Formula 4 | 71.7 | Formula 6 | 6.9 | 56 | 91 | 4 | 1.5957 | 92 |
| Ex. 3 | Formula 4 | 65.8 | Formula 6 | 12.4 | 62 | 96 | 3 | 1.5921 | 90 |
| Ex. 4 | Formula 5 | 70.7 | Formula 7 | 5.1 | 45 | 76 | 5 | 1.5985 | 91 |
| Ex. 5 | Formula 5 | 69.5 | Formula 7 | 7.2 | 47 | 81 | 2 | 1.5948 | 89 |
| Ex. 6 | Formula 5 | 65.9 | Formula 7 | 11.3 | 49 | 89 | 3 | 1.5912 | 88 |
| C. Ex. 1 | Formula 4 | 57.2 | Formula 6 | 19.2 | 64 | 111 | 7 | 1.5903 | 81 |
| C. Ex. 2 | Formula 4 | 76.8 | Formula 6 | 1.4 | 44 | 65 | 14 | 1.5902 | 90 |
| C. Ex. 3 | Formula 5 | 59.7 | Formula 7 | 17.4 | 57 | 106 | 6 | 1.5910 | 82 |
| C. Ex. 4 | Formula 5 | 73.6 | Formula 7 | 2.9 | 41 | 62 | 16 | 1.5986 | 91 |

RI: refractive index,
HR: heat resistance

As shown in Table 1, the polythiol compositions of the Examples and the Comparative Examples showed that as the content of the second polythiol compounds (Formulae 6 and 7) having a hydrogen-bondable functional group increased, the initial viscosity and the viscosity after 5 hours were increased and that the generation rate of striae was increased with the increased viscosity. However, in Comparative Examples 1 to 4, in which the content of the second polythiol compound was less than, or greater than, the content of the second polythiol compound employed in the Examples in an appropriate amount, particularly 3 to 15% by weight, the heat resistance was poor. Thus, it was confirmed that as the content of the second polythiol having a hydrogen-bondable functional group is increased, the generation rate of striae may be somewhat reduced. However, when the level of the second polythiol exceeds the appropriate level, such properties as heat resistance would be poor.

The invention claimed is:

1. A polythiol composition, which comprises a first polythiol compound having an ester group and a mercapto group only as a hydrogen-bondable functional group; and
   a second polythiol compound having an ester group and a hydrogen-bondable functional group other than a mercapto group,
   wherein the polythiol composition comprises the first polythiol compound in an amount of 60 to 85% by weight and the second polythiol compound in an amount of 3 to 15% by weight, based on the total weight of the polythiol composition, and
   wherein the first polythiol compound is a compound represented by the following Formula 4 or 5; and the second polythiol compound is a compound represented by the following Formula 6 or 7:

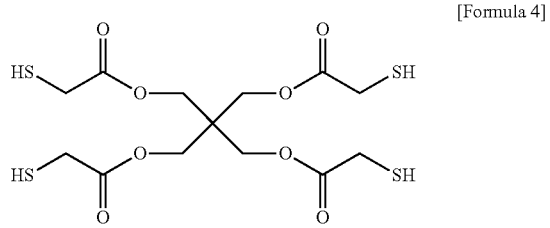
[Formula 4]

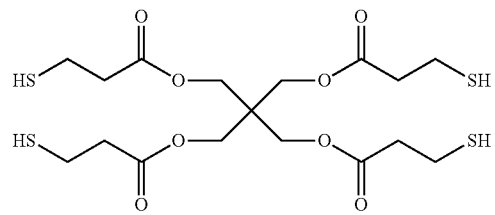
[Formula 5]

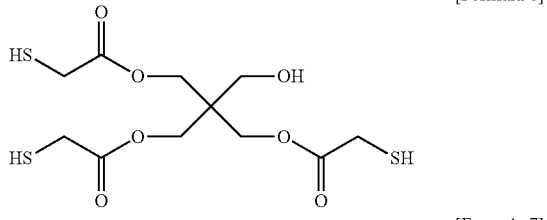
[Formula 6]

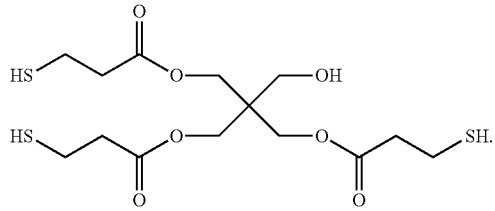
[Formula 7]

2. The polythiol composition of claim 1, which comprises 2 to 30 parts by weight of the second polythiol compound per 100 parts by weight of the first polythiol compound.

3. The polythiol composition of claim 1, wherein the first polythiol compound contains oxygen atoms in an amount of 24 to 34% by mole based on the total molar amount of the first polythiol compound; and
   the second polythiol compound contains oxygen atoms in an amount of 25 to 34% by mole based on the total molar amount of the second polythiol compound.

4. The polythiol composition of claim 1, which is prepared by subjecting a compound represented by the following Formula 1; and a compound represented by the following formula 2 or a compound represented by the following Formula 3 to a non-hydrocondensation reaction:

[Formula 1]
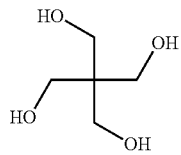

[Formula 2]
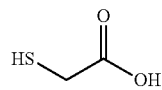

[Formula 3]
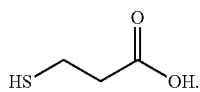

5. The polythiol composition of claim 4, which is obtained by reacting the compound represented by Formula 2 or 3 in an amount of 3.7 to 5.0 moles per 1 mole of the compound represented by Formula 1.

6. The polythiol composition of claim 4, which is obtained by reacting the compound represented by Formula 2 or 3 in an amount of 3.0 to 3.6 moles per 1 mole of the compound represented by Formula 1.

7. A polymerizable composition, which comprises a polythiol composition comprising a first polythiol compound and a second polythiol compound; and a polyisocyanate compound, wherein the first polythiol compound has an ester group and a mercapto group only as a hydrogen-bondable functional group; and the second polythiol compound has an ester group and a hydrogen-bondable functional group other than a mercapto group, wherein the polythiol composition comprises the first polythiol compound in an amount of 60 to 85% by weight and the second polythiol compound in an amount of 3 to 15% by weight, based on the total weight of the polythiol composition, and wherein the first polythiol compound is a compound represented by the following Formula 4 or 5; and the second polythiol compound is a compound represented by the following Formula 6 or 7:

[Formula 4]
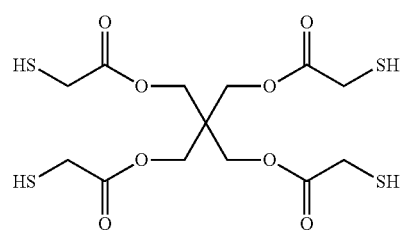

[Formula 5]
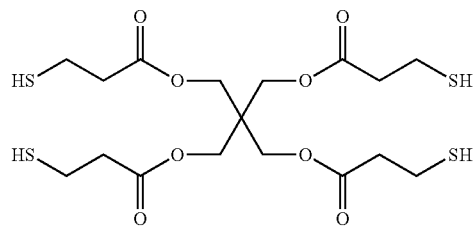

[Formula 6]
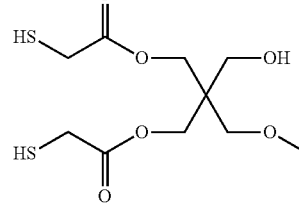

[Formula 7]
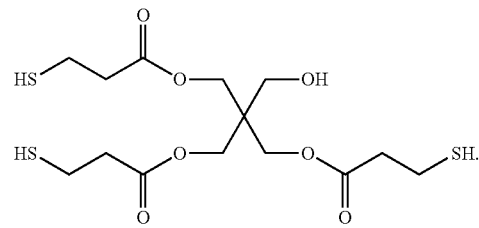

8. An optical lens, which comprises a polythiourethane-based resin formed by curing a polymerizable composition, which comprises a polythiol composition comprising a first polythiol compound and a second polythiol compound; and a polyisocyanate compound, wherein the first polythiol compound has an ester group and a mercapto group only as a hydrogen-bondable functional group; and the second polythiol compound has an ester group and a hydrogen-bondable functional group other than a mercapto group, and wherein the polythiol composition comprises the first polythiol compound in an amount of 60 to 85% by weight and the second polythiol compound in an amount of 3 to 15% by weight, based on the total weight of the polythiol composition, and wherein the first polythiol compound is a compound represented by the following Formula 4 or 5; and the second polythiol compound is a compound represented by the following Formula 6 or 7:

[Formula 4]
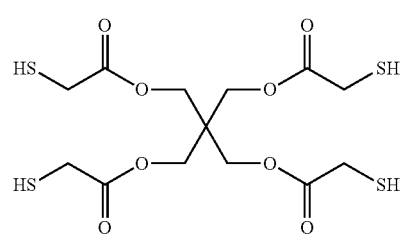

[Formula 5]
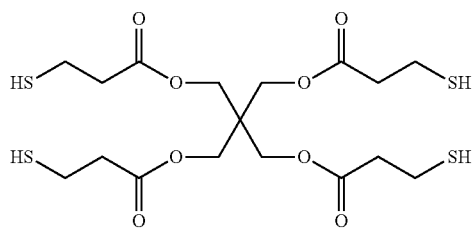
[Formula 6]
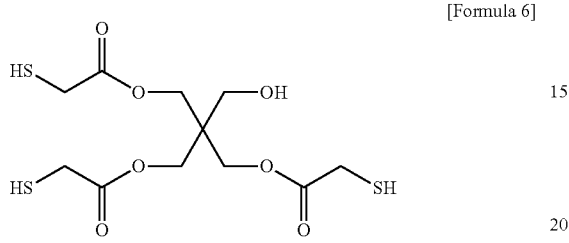
[Formula 7]
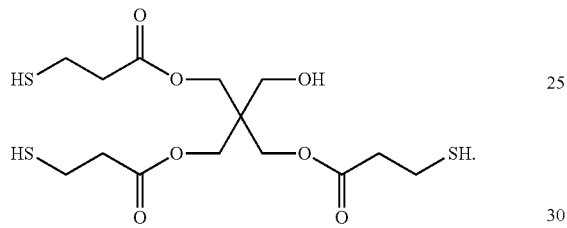
* * * * *